Oct. 20, 1964 A. W. HOLLETT 3,153,550
SPLIT COUPLING WITH AN INTEGRALLY FORMED ONE-PIECE GASKET
Filed March 13, 1964 2 Sheets-Sheet 1
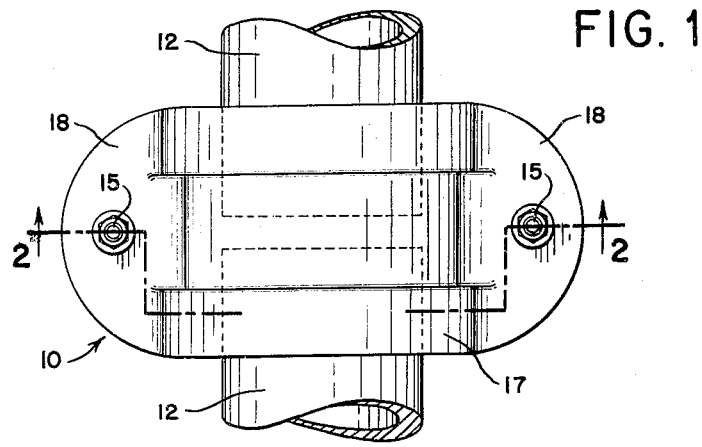
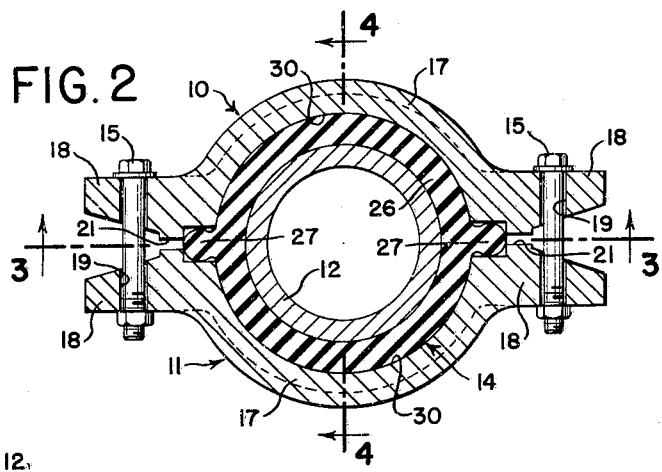
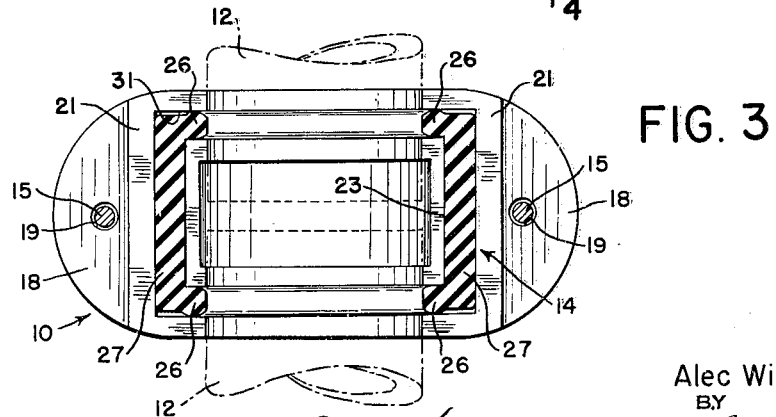
INVENTOR
Alec William Hollett
BY
Pennie, Edmonds, Morton, Barrows & Taylor
ATTORNEYS Oct. 20, 1964  A. W. HOLLETT  3,153,550
SPLIT COUPLING WITH AN INTEGRALLY FORMED ONE-PIECE GASKET
Filed March 13, 1964  2 Sheets-Sheet 2

INVENTOR
Alec William Hollett
BY
Pennie, Edmonds, Morton, Barrows & Taylor
ATTORNEYS

United States Patent Office 3,153,550
Patented Oct. 20, 1964

3,153,550
SPLIT COUPLING WITH AN INTEGRALLY
FORMED ONE-PIECE GASKET
Alec William Hollett, 34 Buckingham Road,
Cresskill, N.J.
Filed Mar. 13, 1964, Ser. No. 352,716
3 Claims. (Cl. 285—179)

This invention relates to pipe couplings. More particularly it relates to a new pipe coupling adapted to join the ends of two lengths of pipe together without the necessity for threading, grooving, flanging or otherwise modifying the pipe structure and further without the necessity for placing any part of the coupling structure on or about the pipes prior to placing the two pipes together in their desired final position with the ends of the pipes substantially abutting each other.

The usual way of joining or coupling two lengths of pipe together comprises threading the adjacent ends of the two pipes and screwing the threaded pipes into an internally threaded cylindrical coupling member, or fitting the adjacent ends of the pipe with flanges which are then bolted together. However, there are many instances when it is impractical or impossible to couple the adjoining ends of pipe together in either of the aforementioned ways, and a number of different pipe couplings have been devised by which two sections of pipe can be joined together without prior threading or flanging the ends of the pipe.

One of the most successful of these "flangeless" pipe couplings requires the use of a cylindrical center section which spans the gap between the ends of the two pipes, separate circular gaskets which fit about the ends of each pipe adjacent the center section of the coupling, and clamping means which are fitted about the ends of each pipe and which are adapted to be drawn together by bolts or the like to force the circular gaskets into the narrow annular space between the cylindrical outer surface at the ends of each of the pipes and the inner surface of the cylindrical center section of the coupling structure. Another widely used "flangeless" pipe coupling comprises a cylindrical gasket member adapted to span the gap between the ends of the two pipes and two semi-cylindrical clamp members which are clamped about the gasket and the adjacent ends of the pipes. However, the latter coupling construction usually requires that a groove be formed in the outer pipe wall or that a knurled roller be disposed between the pipe wall and the clamp members to prevent the pipe connection from being too easily pulled apart. Moreover, both of these pipe couplings require the placement of one or more of their parts about the outer surface of one or both of the pipes being joined together before the ends of these pipes are brought into their final abutting position. This limitation in the manner in which these pipe couplings must be assembled about the pipes being joined together precludes their use in many important applications such as, for example, the installation of pipe in close quarters.

I have now developed a new pipe coupling which does not require any preparation of the ends of the pipes being joined together such as threading, flanging or grooving, and which does not require that any portion or component of the coupling be placed about the ends of the pipes being joined prior to placing the pipes in their final position with their ends approximately abutting each other. My new pipe coupling is economical to manufacture and simple to install, and as a result of its unique construction can be used in many situations in which the pipe couplings of the prior art can not be employed. Moreover, my pipe coupling structure is not only adapted to serve as a standard coupling for connecting the abutting ends of two pipes together but also is adaptable to serve as an elbow for connecting together the ends of two pipes disposed at, say, right angles to each other and further is adaptable to serve as such pipe fittings as T's and crosses that connect the adjacent ends of three or more pipes together.

Accordingly, my new pipe coupling comprises a one-piece gasket of resilient material adapted to be placed about the adjoining ends of the two or more pipes being coupled together, two generally semi-tubular clamp members adapted to be clamped about the gasket, and means for clamping the two clamp members together. The one-piece gasket has two or more laterally disposed and longitudinally spaced ring portions connected together by two longitudinally disposed side portions, each of the ring portions being adapted to fit snugly about the outer circumferential surface of one of the pipes being coupled together adjacent the ends thereof. The longitudinal side portions of the gasket are spaced an appreciable distance outboard from the outer circumferential surface of the pipes being coupled together. The two generally semi-tubular clamp members are adapted to be clamped together by the clamp means along facing longitudinal surfaces to form a generally tubular coupling structure, the inner circumferential surfaces of the two clamp members being adapted to fit closely about and in contact with the outer circumferential surfaces of each of the pipes being coupled together adjacent the ends thereof. The angular distance along the inner circumferential surface of each clamp member from one longitudinal surface to the other longitudinal surface thereof is less than 180° so that the facing longitudinal surfaces of the two clamp members will be spaced a small distance apart when the two clamp members are placed about the end of two pipes being coupled together. The inner circumferential surfaces of the clamp members are formed with circumferentially disposed grooves adapted to receive the lateral ring portions of the gasket, and the facing longitudinal surfaces of the clamp members are formed with longitudinally disposed grooves adapted to receive the longitudinal side portions of the gasket. The cross sectional area of the gasket-receiving space defined by the longitudinally disposed grooves is larger than the cross sectional area of the longitudinal side portions of the gasket received therein so that when the clamp members and gasket are placed about the ends of the two pipes being coupled together the resulting compression of the longitudinal portions of the gasket will not prevent the inner circumferential surfaces of the two clamp members from firmly gripping the outer circumferential surfaces of the pipes being coupled together. When assembled about the adjacent ends of the lengths of pipe being coupled together, the gasket, tubular clamp members and clamp means form a secure and fluid-tight connection between the two or more pipes without requiring threading, flanging, grooving or other treatment of the pipe.

My new pipe coupling will be better understood from the following description in conjunction with the accompanying drawings of which FIG. 1 is a plan view of the coupling clamped in position about the ends of two pipes being joined together;

FIG. 2 is a sectional view along line 2—2 of FIG. 1;

FIG. 3 is a sectional view along line 3—3 of FIG. 2, the pipes being indicated only by dotted lines;

Figure 4:
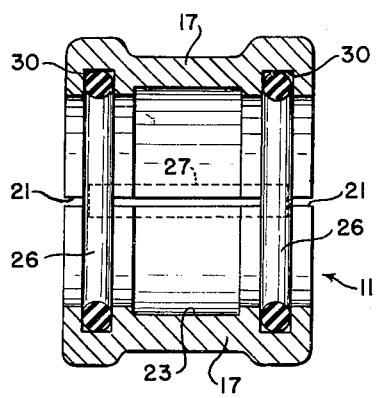
FIG. 4 is a sectional view along line 4—4 of FIG. 2, the pipes not being shown.

In the interest of simplicity my new pipe coupling structure will be described with particular reference to a coupling adapted to connect the adjoining ends of two pipes of equal diameter and disposed in axial alignment with each other. As will be seen best in FIGS. 1 through 3, the major components of my improved pipe coupling comprise two generally semi-tubular clamp members 10 and 11 which are adapted to be clamped together about the adjacent ends of two pipes 12 being coupled together, a one-piece gasket 14 adapted to fit around the ends of the pipes 12 between the pipe and the adjacent surfaces of the two clamp members, and means for clamping the two clamp members together, such as, for example, the bolts 15.

The generally semi-tubular clamp members 10 and 11 are formed from a suitable strong and substantially rigid material, and advantageously from a metal such as cast or forged steel. Each of the clamp members 10 and 11 comprises a semi-tubular portion 17 and at least two wing portions 18 which extend laterally outwardly from the semi-tubular portion, each of the wing portions being formed with holes or slots 19 adapted to receive the clamp means or bolts 15. The semi-tubular portion 17 of each clamp member is adapted to fit closely around the end of the pipe being joined together, the radius of the inner circumferential surface of this semi-tubular portion being approximately the same as the radius of the outer circumferential surface of the pipe 12 to be coupled together so that when the clamp member is positioned on the end of a pipe 12 the inner circumferential surface of the portion 17 thereof will closely contact the outer circumferential surface of the pipe 12. Moreover, the angular distance along the inner circumferential surface of each clamp member from one longitudinal surface 21 to the other longitudinal surface 21 thereof is slightly less than 180° so that when the two clamp members 10 and 11 are placed about the ends of the pipes 12 with their longitudinal surfaces 21 in face to face relationship, these facing longitudinal surfaces 21 will be spaced apart a small but appreciable distance. Thus, when the two clamp members 10 and 11 are assembled about the ends of the pipes 12 and are clamped together by means of the bolts 15, the inner circumferential surfaces of the clamp members 10 and 11 firmly grip the pipes 12 and securely hold the ends of the two pipes together while the facing longitudinal surfaces 21 of the two clamp members do not contact each other, thus insuring that the clamping force of the bolts 15 is exerted wholly against the outer surfaces of the two pipes 12 and not against the facing longitudinal surfaces 21 of the two clamp members.

The outer circumferential surfaces at the ends of the pipes 12 being joined together do not require threading, flanging, grooving or any other preparations or treatment in order to form a strong and secure connection between the two pipes. The inner circumferential surfaces of the clamp members 10 and 11 can be machined to obtain a substantially smooth arcuate surface, or the inner surfaces can be left unfinished so that they will have the slight irregularities or graininess characteristic of the surface of a rough casting or forging. Or, if desired, these inner surfaces can be formed with small circumferential ridges and grooves which enhance the mechanical gripping action of the clamp members when fitted about and clamped on the ends of the pipes. Moreover, the central portion 23 of the inner circumferential surface of the clamp members 10 and 11 is advantageously recessed as shown best in FIGS. 3 and 4 so that the two edge portions thereof which contact the outer surfaces of the pipes 12 are clearly defined and so that the clamping forces exerted by the bolts 15 against the pipes 12 is concentrated in these limited and well defined areas or portions of the clamp members. In addition, the inner circumferential surfaces and facing longitudinal surfaces of the clamp members 10 and 11 are formed with grooves adapted to receive the gasket 14 of my new pipe coupling, as is hereinafter more fully described.

Figure 5:
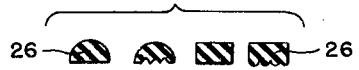
FIG. 5 is a sectional view of various cross sectional shapes that the ring portion of the gasket may have.

The gasket 14 is formed in one piece from a suitable resilient material such as rubber, synthetic rubber-like materials, impregnated asbestos fibers and the like. The gasket comprises two laterally disposed and longitudinally spaced ring portions 26 connected together by two longitudinally disposed side portions 27. The ring portions 26 of the gasket are adapted to fit snugly about the circumferential surfaces of the two pipes 12 being coupled together adjacent the ends of the pipes, and the two longitudinally disposed side portions 27 are spaced an appreciable distance from the outer circumferential surfaces of the pipes 12. The cross-sectional shape of the ring portions 26 of the gasket 14 is not critical as long as it is capable of forming a leak-proof seal with the outer surfaces of the pipes 12 when pressed thereagainst. For example, it can have a circular cross-section as shown in FIGS. 2, 3 and 4, or as shown in FIG. 5 its cross-section can be half-round or rectangular so that a flat surface will be in contact with the outer surface of the pipe. Moreover, as also shown in FIG. 5, the surface of the gasket 14 in contact with the surface of the pipes 12 can be corrugated or formed with grooves to improve the effectiveness of the seal between the gasket and the pipe.

Figure 7:
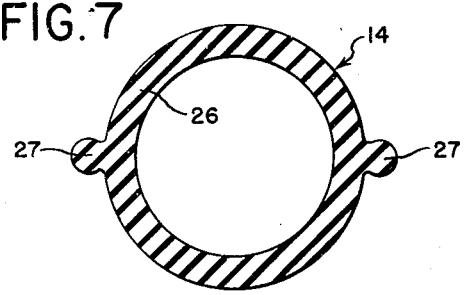
FIG. 7 is an end view of my one-piece gasket.

As shown in FIG. 7 the ring portions 26 of the gasket 14 are not severed at any point, thus eliminating any possibility of leakage at the severed place. To install my gasket 14 about the adjoining ends of the two pipes being connected together these ends are separated slightly so as to permit one of the solid or non-severed ring portions 26 to be slipped through the gap separating the ends of the pipe and thence on to the outer surface of one of the pipes adjacent the end thereof. After positioning one ring portion 26 on one of the pipes the other ring portion 26 is slipped through the gap separating the ends of the pipes and then is slid on to the outer surface adjacent the end of the other of the pipes being connected together.

As previously pointed out the inner circumferential surfaces and the facing longitudinal surfaces of the clamp members 10 and 11 are formed with grooves adapted to receive the gasket 14. Circumferential grooves 30 formed in the inner circumferential surfaces of the clamp members 10 and 11 are adapted to receive the laterally disposed ring portions 26 of the one-piece gasket 14, and longitudinal grooves 31 formed in the facing longitudinal surfaces 21 of the clamp members are adapted to receive the longitudinally disposed side portions 27 of the gasket 14. The depth and shape of the circumferential grooves 30 are such that not all (say, approximately two-thirds) of the ring portions 26 of the gasket are received in the groove when the gasket and clamp members are first placed around the ends of the pipes being joined together, but substantially all of the resilient ring portions 26 are received in the space defined by the walls of the groove 30 and the immediately adjacent surface of the pipe 12 when the clamp members are firmly clamped in their ultimate position about the pipes 12 with their inner circumferential surfaces in contact with the outer surfaces of the pipe. Similarly, the depth and shape of the longitudinal grooves 31 in each clamp member are such that less than one-half the longitudinal side portions 27 of the gasket 14 are received in the groove when the gasket and clamp members are first placed about the ends of the pipes 12 being joined together so that these resilient side portions will be firmly compressed and forced into the longitudinal grooves when the clamp members are firmly clamped in their ultimate position about the pipes 12. Moreover, as clearly shown in FIG. 2, the cross sectional area of the gasket-receiving space defined by the two longitudinally disposed grooves 31 formed in the facing longitudinal surfaces of the clamp members is slightly larger than the cross sectional area of the longitudinal side portions 27 received therein so that when the clamp members are placed about the ends of the two pipes being coupled together the resulting compression of the longitudinal side portions 27 will not prevent the inner circumferential surfaces of the two clamp members from contacting and firmly gripping the outer circumferential surfaces of the two pipes being coupled together. That is to say, the circular cross section of the longitudinal portions 27 of the gasket shown in FIG. 2 does not quite fill the rectangular cross section of the gasket-receiving space defined by the longitudinal grooves 31 (which space includes the gap between the facing surfaces of the clamp members) so that when the portions 27 are compressed as previously described, the resilient gasket material will be squeezed into the empty corners of the grooves 31 thereby permitting the inner circumferential surfaces of the clamp members to grip the outer circumferential surfaces of the pipes without interference. As a consequence, a secure and fluid-tight seal is obtained between the outer surfaces of the pipes 12, the inner circumferential surfaces of the clamp members 10 and 11 and the ring portions 26 of the gasket 14, and between the longitudinal surfaces 21 of the clamp members and the side portions 27 of the gasket.

My new pipe coupling is employed to join two lengths of pipe 12 together in the following manner. First, the ring portions 26 of the one-piece gasket 14 are placed about the adjacent ends of the two pipes 12 in the manner previously described. The two clamp members 10 and 11 are then fitted about the ends of the pipes 12 so that the ring portions 26 of the gasket are received in the circumferential grooves 30 formed on the inner circumferential surface of the clamp members and the side portions 27 of the gasket are received in the corresponding longitudinal grooves 31 formed in the facing longitudinal surfaces 21 of the clamp members. Bolts 15 are then inserted through the bolt holes 19, and the two clamp members 10 and 11 are evenly drawn together by tightening the bolts. When the two clamp members have been drawn tightly against the ends of the pipes 12 encircled thereby, the clamp members securely grip the outer surfaces of the pipes 12 and the resilient gasket 14 is pressed firmly against the said outer circumferential surfaces and into the circumferential and longitudinal grooves formed in the clamp members. As a result, the pipes are securely joined together by a fluid-tight pipe coupling structure that requires no special preparation of the pipe ends and that is exceedingly simple to apply to the pipes being joined together.

Figure 6:
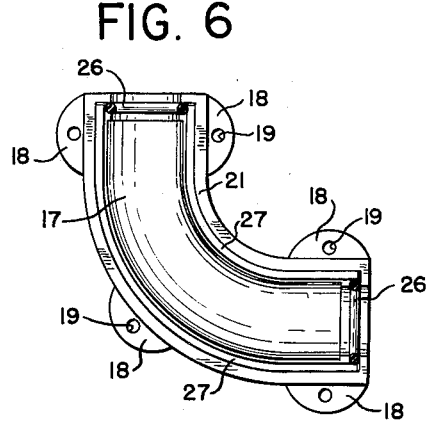
FIG. 6 is a plan view of a modified form of my coupling structure with the uppermost tubular clamp member removed.

In addition to the straight line connection between two pipes of the same diameter such as that shown in FIGS. 1 to 4, my new coupling construction can readily be adapted or modified to provide such pipe fittings as elbows, T's, reducing couplings or fittings between pipes of different diameters and the like. For example, as shown in FIG. 6, my coupling structure can be modified to form a large radius elbow by elongating and curving the semi-tubular clamp members 10 and 11 and by elongating and curving the longitudinal side portions 27 of the gasket 14 a corresponding amount. Thus, the elbow shown in FIG. 6 comprises semi-tubular clamp members 10 and 11 (the uppermost clamp member 11 being removed for purposes of illustration), a one-piece gasket 14 and clamp means or bolts 15 (not shown). As before, each semi-tubular clamp member comprises a semi-tubular portion 17 and wing portions 18 which are formed with holes adapted to receive the bolts 15. Similarly, the gasket 14 comprises two laterally disposed ring portions 26 (shown partially in section) and the aforementioned elongated and curved side portions 27. It will readily be appreciated that other modifications of my coupling construction can be effected to provide such pipe fittings as T's, reducing couplings and the like.

From the foregoing description of my improved pipe coupling construction, it will be seen that I have made an important contribution to the art to which my invention relates.

This application is a continuation-in-part of my co-pending application Serial No. 68,533, now abandoned, filed November 10, 1960, which is a continuation-in-part of my application Serial No. 858,090, now abandoned, filed December 8, 1959.

I claim:
1. A pipe coupling comprising:
(a) a one-piece gasket of resilient material having at least two laterally disposed and longitudinally spaced ring portions integrally connected together by two longitudinally disposed side portions, each said ring portions being integrally formed in one piece and each ring portion being adapted to fit snugly about the outer circumferential surfaces of at least one of two adjacent pipes being coupled together adjacent the ends thereof and said longitudinal side portions being spaced an appreciable distance outboard from the outer circumferential surfaces of said ring portion and of the pipes being coupled together;
(b) two generally semi-cylindrical clamp members having a longitudinal disposed surface adapted to be clamped together with said longitudinal surfaces in opposed facing relationship to form a generally tubular coupling structure, the inner circumferential surfaces of the two clamp members being adapted to fit closely about and in contact with the outer circumferential surfaces of the two pipes being coupled together adjacent the ends thereof, the angular distance along the inner circumferential surface of each clamp member from one longitudinal surface to the other longitudinal surface thereof being less than 180° whereby the facing longitudinal surfaces of the two clamp members are spaced a small distance apart when the two clamp members are placed about the ends of two pipes being coupled together, said inner circumferential surfaces of said clamp members being formed with circumferentially disposed grooves adapted to receive the laterally disposed ring portions of the gasket and said facing longitudinal surfaces of said tubular clamp members being formed with longitudinally disposed grooves adapted to receive the longitudinal side portions of the gasket, the cross sectional area of the gasket receiving space defined by the facing longitudinally disposed grooves being larger than the cross sectional area of the longitudinal side portions of the gasket received therein whereby the inner circumferential surfaces of the two clamp members firmly grip the outer circumferential surfaces of two pipes being coupled together when placed about the ends of said pipes; and
(c) means for clamping the two clamp members together.
2. A pipe coupling according to claim 1 in which the two semi-cylindrical clamp members are curved longitudinally, and in which the longitudinally disposed side portions of the gasket are curved longitudinally a corresponding amount, so that they form an elbow-shaped coupling structure when clamped together.
3. A pipe coupling according to claim 1 in which the center portion of the inner cylindrical surface of each semi-cylindrical clamp member is recessed whereby the edge portions of said inner surface adapted to contact the pipes being coupled together are sharply defined.

References Cited in the file of this patent

UNITED STATES PATENTS

| | | |
|---|---|---|
| 881,022 | Nailler | Mar. 3, 1908 |
| 1,994,361 | Johnson | Mar. 12, 1935 |
| 2,245,154 | McWane | June 10, 1941 |
| 2,883,211 | Grass | Apr. 21, 1959 |
| 2,899,984 | Gaffin | Aug. 18, 1959 |
| 3,078,108 | Smith | Feb. 19, 1963 |

FOREIGN PATENTS

| | | |
|---|---|---|
| 790,109 | Great Britain | Feb. 5, 1958 |